US007895038B2

(12) United States Patent
Nishimura et al.

(10) Patent No.: US 7,895,038 B2
(45) Date of Patent: *Feb. 22, 2011

(54) SIGNAL ENHANCEMENT VIA NOISE REDUCTION FOR SPEECH RECOGNITION

(75) Inventors: Masafumi Nishimura, Kanagawa-ken (JP); Tetsuya Takiguchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/126,971

(22) Filed: May 26, 2008

(65) Prior Publication Data

US 2008/0294432 A1 Nov. 27, 2008

Related U.S. Application Data

(63) Continuation of application No. 11/067,809, filed on Feb. 28, 2005, now Pat. No. 7,533,015.

(30) Foreign Application Priority Data

Mar. 1, 2004 (JP) ............................ 2004-055812

(51) Int. Cl.
*G10L 17/00* (2006.01)

(52) U.S. Cl. ...................................................... 704/250

(58) Field of Classification Search .......... 704/250–255
See application file for complete search history.

(56) References Cited

U.S. PATENT DOCUMENTS 4,352,182 A * 9/1982 Billi et al. ................... 714/714
4,628,259 A * 12/1986 Takahashi et al. ...... 324/207.21
5,473,684 A 12/1995 Bartlett et al.
5,666,429 A 9/1997 Urbanski
5,706,392 A 1/1998 Goldberg et al.
5,749,068 A * 5/1998 Suzuki ....................... 704/233
5,933,495 A * 8/1999 Oh ........................ 379/406.08
5,956,679 A 9/1999 Komori et al.

(Continued)

FOREIGN PATENT DOCUMENTS

JP 61150497 A 7/1986

(Continued)

OTHER PUBLICATIONS

Recognition of Time Series . . . , Jul. 16, 2002, IEICE DSP2002-100, JP.

*Primary Examiner*—Michael N Opsasnick
(74) *Attorney, Agent, or Firm*—Cantor Colburn LLP; Vazken Alexanian

(57) ABSTRACT

Speech enhancement techniques for extemporaneous noise without a noise interval and unknown extemporaneous noise are provided with a method of signal enhancement including subtracting a given reference signal from an input signal containing a target signal and a noise signal by spectral subtraction; applying an adaptive filter to the reference signal; and controlling a filter coefficient of the adaptive filter in order to reduce components of the noise signal in the input signal. In signal enhancement, a database of a signal model concerning the target signal expressing a given feature by a given statistical model is provided, and the filter coefficient is controlled based on the likelihood of the signal model with respect to an output signal from the spectral subtraction means.

12 Claims, 7 Drawing Sheets

U.S. PATENT DOCUMENTS

| | | | | |
|---|---|---|---|---|
| 5,978,824 | A * | 11/1999 | Ikeda | 708/322 |
| 6,134,334 | A * | 10/2000 | Killion et al. | 381/356 |
| 6,151,399 | A | 11/2000 | Killion et al. | |
| 6,920,421 | B2 * | 7/2005 | Pao | 704/211 |
| 7,043,425 | B2 * | 5/2006 | Pao | 704/211 |
| 7,047,047 | B2 * | 5/2006 | Acero et al. | 455/563 |
| 7,117,148 | B2 * | 10/2006 | Droppo et al. | 704/228 |

FOREIGN PATENT DOCUMENTS

| | | | |
|---|---|---|---|
| JP | 2001501327 | T2 | 1/2001 |
| JP | 2001517325 | T2 | 10/2001 |
| JP | 2003271191 | A2 | 9/2003 |

* cited by examiner

| | EXAMPLE | COMPARATIVE EXAMPLE 1 | COMPARATIVE EXAMPLE 2 |
|---|---|---|---|
| KNOCK (0dB) | 4.44 % | 9.00 % | 6.92 % |
| KNOCK (5dB) | 3.10 % | 6.39 % | 4.54 % |
| KNOCK (0dB) AND CD (0dB) | 14.3 % | 42.9 % | 26.5 % |
| KNOCK (5dB) AND CD (5dB) | 6.85 % | 28.8 % | 14.5 % |

SIGNAL ENHANCEMENT VIA NOISE REDUCTION FOR SPEECH RECOGNITION

CROSS REFERENCE TO RELATED APPLICATION

The present application is a continuation application of U.S. application Ser. No. 11/067,809, filed Feb. 28, 2005, now U.S. Pat. 7,533,015, which claims priority to Japanese Patent Application 2004-55812, filed Mar. 1, 2004, the contents of which are incorporated herein by reference in their entirety.

TECHNICAL FIELD

The present invention is directed to signal enhancement methods, systems and apparatus, and to speech recognition.

BACKGROUND

As a technique for removing noise components from a speech signal inputted through a microphone, a signal processing technique using an adaptive microphone array which adopts a plurality of microphones and an adaptive filter has been heretofore known.

The following documents are considered herein:

[Patent Document 1]

Japanese Unexamined Patent Publication No. 2003-280686

[Non-Patent Document 1]

L. J. Griffiths and C. W. Jim, "An alternative approach to linearly constrained adaptive beamforming", IEEE Trans. AP, Vol. 30, no. 1, pp. 27-34, January 1982

[Non-Patent Document 2]

Y. Kaneda and J. Ohga, "Adaptive microphone-array system for noise reduction,"

IEEE Trans. ASSP, vol. 34, no. 6 pp. 1391-1400, December 1986

[Non-Patent Document 3]

Nagata, Fujioka, and Abe, "Study of speaker-tracking two-channel microphone array using SS control based on speaker direction", Collected papers for Autumn Conference of Acoustic Society of Japan, 1999, p. 477-478

As major adaptive microphone arrays, a Griffiths-Jim array (refer to non-patent document 1), an adaptive microphone array for noise reduction (AMNOR; refer to non-patent document 2), and the like have been heretofore known. In any case, a signal in a noise interval in an observed signal is used to design an adaptive filter. Further, a technique has also been known in which a Griffiths-Jim array is realized in the frequency domain and in which detection accuracy is improved in speech and noise intervals (refer to non-patent document 3).

In such adaptive microphone array processing, noise reduction performance can be generally improved by increasing the number of used microphones. On the other hand, in information terminal devices and the like including personal computers, the number of microphones capable of being used for speech input is limited by constraints of cost and hardware. With the technique of the above-described non-patent document 3, noise-resistant adaptive microphone array processing can be realized by spectral subtraction using a two-channel microphone array.

FIG. 8 is a block diagram showing a conventional speech enhancement system using a two-channel beamformer. This system has two microphones 81*a* and 81*b* for converting acoustic signals into electric signals, an adder 82*a* for adding the input signals from the microphones 81*a* and 81*b*, an adder 82*b* for adding the input signal from the microphone 81*b* to the input signal from the microphone 81*a* after inverting the input signal from the microphone 81*b*, fast Fourier transformers 83*a* and 83*b* for performing fast Fourier transformation on the output signals from the adders 82*a* and 82*b* using a predetermined frame length and frame period, an adaptive filter 84 provided on the output side of the fast Fourier transformer 83*b*, and an adder 85 for adding the output signal from the adaptive filter 84 to the output signal of the fast Fourier transformer 83*a* after inverting the output signal from the adaptive filter 84.

In the case where a target speech source 1*s* emitting target speech to be enhanced is located equidistant from the microphones 81*a* and 81*b* in the front direction and where a noise source 1*n* is located in other direction, respective input signals m1(t) and m2(t) from the microphones 81*a* and 81*b* at time t can be represented by equation 1:

$$m1(t)=s(t)+n(t),\ m2(t)=s(t)+n(t-d) \quad \text{[Equation 1]}$$

where s(t) denotes a target speech signal which includes components based on the target speech, n(t) and n(t−d) denote noise signals which include components based on noise from the noise source 1*n*, and *d* denotes a delay time caused by the fact that the respective distances from the noise source in to the microphones 81*a* and 81*b* are different from each other.

At this time, the addition of the input signal m2(t) to the input signal m1(t) after inverting the input signal m2(t) using the adder 82*b* means that the input signals m1(t) and m2(t) are added together in the opposite phases. Accordingly, the target speech signals s(t) cancel out each other, and there remain only components having a correlation with the noise from the noise source 1*n*. When these components are referred to as a reference input r(t), the reference input r(t) can be represented by the following equation:

$$r(t)=m1(t)-m2(t)=n(t)-n(t-d) \quad \text{[Equation 2]}$$

On the other hand, when a signal obtained by adding the input signals m1(t) and m2(t) together using the adding means 82*a* is referred to as a main input p(t), the main input p(t) can be represented by the following equation:

$$p(t)=\tfrac{1}{2}(m1(t)+m2(t))=s(t)+\tfrac{1}{2}(n(t)+n(t-d)) \quad \text{[Equation 3]}$$

Accordingly, an output signal Y in which the noise signals are reduced and in which the target speech signal is enhanced can be obtained by, in the frequency domain, subtracting the reference input from the main input by use of the adding means 85 and applying the adaptive filter 84 to the reference input to adjust a filter coefficient thereof. An output signal y(ω; n) at a frequency ω for a frame number n is given by the following equation:

$$y(\omega;n)=p(\omega;n)-w(\omega)r(\omega;n) \quad \text{[Equation 4]}$$

Here, w(ω) denotes the filter coefficient of the adaptive filter 84 at the frequency ω, and p(ω; n) denotes the main input at the frequency ω for the frame number n. The expression r(ω; n) denotes the reference input at the frequency ω for the frame number n, and the amplitude of r(ω; n) is adjusted using the filter coefficient w(ω).

The filter coefficient w(ω) is adjusted using the input signals m1(t) and m2(t) in a noise interval so that an error e, represented by the equation below, squared is minimized. Incidentally, the noise interval means a time interval in which an input signal based only on noise occurs. Meanwhile, a time interval in which the target speech signal s(t) is contained in an input signal is referred to as a speech occurrence interval.

$$e=p(\omega;n)-w(\omega)r(\omega;n) \quad \text{[Equation 5]}$$

The reason for using input signals in the noise interval is that the learning of the filter coefficient is inhibited if components of the target speech signal are contained in the main input p(ω; n). Accordingly, it is difficult to estimate the filter coefficient w(ω) for removing extemporaneous noise which is completely superimposed on the target speech signal, which exists only in the speech occurrence interval, and which continues for a short time. Accordingly, in speech recognition for transcribing a lecture or a meeting, speech recognition in a car, or the like, extemporaneous noise, such as the sound of something hitting something else, the sound of touching paper for turning a page, the sound of closing a door, or the like, is one cause of deteriorating recognition accuracy.

On the other hand, as a speech recognition method in the presence of extemporaneous noise, a technique has been proposed in which matching between a feature of input speech and a composite model constituted by the Phonemic Hidden Markov model of speech data and the Hidden Markov model of noise data is performed and in which, based on the result, input speech is recognized (refer to patent document 1). In this technique, the type of target extemporaneous noise is necessarily known. However, in some cases, it may be difficult to forecast and model the types of noise which can occur, because various types of noise exist in an actual environment.

As described above, the Griffiths-Jim type is effective for the adaptive microphone array processing using the two-channel microphone array. In this type, the adaptive filter is designed by determining the filter coefficient based on the input signal in the noise interval so as to minimize the power of the noise components. However, in a scene of actual application to the speech recognition, various extemporaneous noises interfere with the speech recognition. An extemporaneous noise may not include the noise interval. In other words, there may be a case where the input signal containing extemporaneous noise components includes only the extemporaneous noise in the speech interval. In that case, the conventional Griffiths-Jim type array processing, in which the filter coefficient is determined based on the signal in the noise interval, cannot deal with the extemporaneous noise.

Meanwhile, according to the speech recognition technique of matching the composite model of both Hidden Markov models for the speeches and the noises, with the feature of the input signal, a type of an extemporaneous noise which is likely to occur must be forecasted and modeled in advance. Therefore, this technique cannot deal with unknown extemporaneous noises.

SUMMARY OF THE INVENTION

In consideration of such problems with the prior art, it is an aspect of the present invention to provide a speech enhancement technique which is effective for an extemporaneous noise without a noise interval and also for unknown extemporaneous noises.

The present invention provides a signal enhancement device designed to enhance a target signal by subtracting a reference signal similar to a noise signal from the target signal, on which the noise signal is superimposed, in accordance with spectral subtraction and by controlling a filter coefficient of an adaptive filter to be applied to the reference signal to reduce the noise signal, a method and a program of the same, a speech recognition device, and a method and a program of the same.

BRIEF DESCRIPTION OF THE DRAWINGS

These, and further, aspects, advantages, and features of the invention will be more apparent from the following detailed description of an advantageous embodiment and the appended drawings wherein.

EXPLANATION OF REFERENCE NUMERALS

Figure 1:
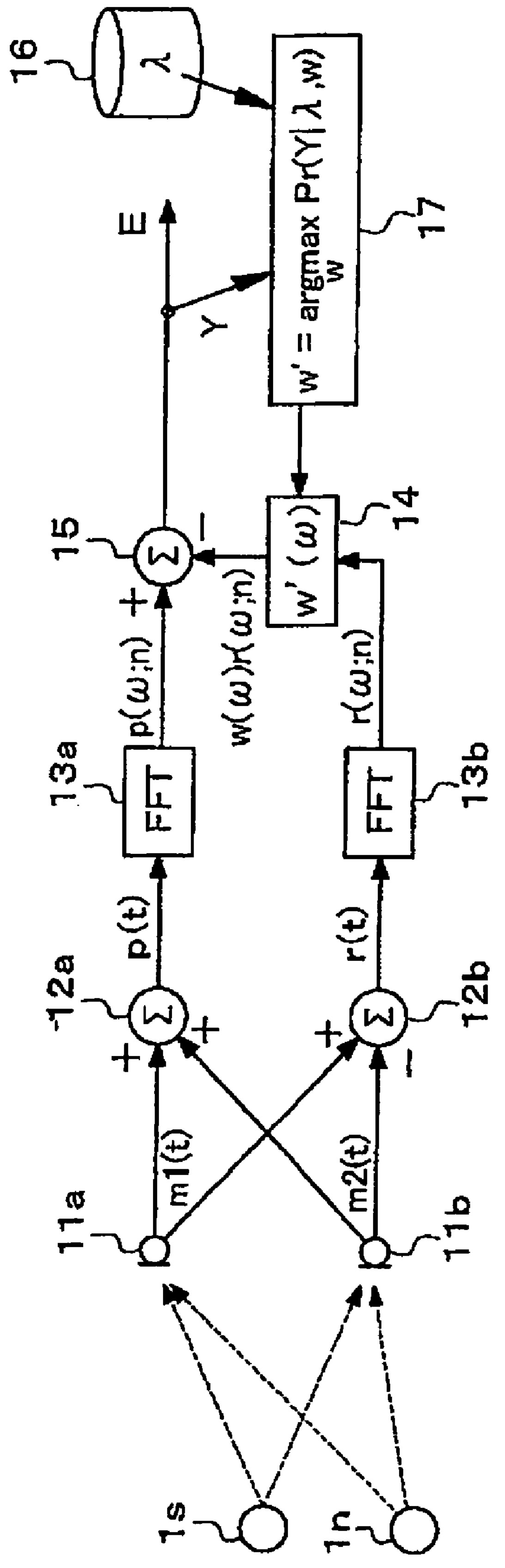
FIG. 1 is a block diagram showing the configuration of a speech enhancement device according to an embodiment of the present invention.

11*a*, 11*b*, 81*a*, 81*b*: MICROPHONE
12*a*, 12*b*, 15, 82*a*, 82*b*, 85: ADDER
13*a*, 13*b*, 83*a*, 83*b*: FAST FOURIER TRANSFORMER
14, 84: ADAPTIVE FILTER
16: DATABASE OF ACOUSTIC MODEL λ
17: FILTER COEFFICIENT UPDATE MEANS
21: CENTRAL PROCESSING UNIT
22: MAIN MEMORY
23: AUXILIARY MEMORY
24: INPUT DEVICE
25: OUTPUT DEVICE
31: SIGNAL SYNTHESIS UNIT
32: FFT UNIT
33: ADAPTIVE FILTER UNIT
34: SPECTRAL SUBTRACTION UNIT
35: FILTER COEFFICIENT UPDATE UNIT
36: ACOUSTIC MODEL
51: SPEECH ENHANCEMENT UNIT
52: FEATURE EXTRACTION UNIT
53: SPEECH RECOGNITION UNIT

DETAILED DESCRIPTION

This invention provides signal enhancement devices and speech recognition. In an example embodiment a signal enhancement device includes: spectral subtraction means for subtracting a given reference signal from a main input signal containing a target signal and a noise signal by spectral subtraction; an adaptive filter applied to the reference signal; coefficient control means for controlling a filter coefficient of the adaptive filter in order to reduce components of the noise signal in the main input signal; and a database of a signal model concerning the target signal expressing a given feature by means of a given statistical model. Here, the coefficient control means performs control of the filter coefficient based on a likelihood of the signal model with respect to an output signal from the spectral subtraction means.

Furthermore, a signal enhancement method of the present invention comprises: performing spectral subtraction for obtaining an enhanced output signal by subtracting a given reference signal from a main input signal containing a target signal and a noise signal by spectral subtraction; applying an adaptive filter to the reference signal; and coefficient controlling for controlling a filter coefficient of the adaptive filter in order to reduce the noise signal components in the main input signal. Here, the coefficient controlling comprises referencing a signal model concerning the target signal expressing a given feature by means of a given statistical model, and controlling the filter coefficient based on a likelihood of the signal model with respect to the enhanced output signal.

Here, an appropriate target signal is, for example, one based on speech of an utterance. An appropriate noise signal is, for example, one based on steady-state noise or extemporaneous noise. An appropriate main input signal is, for example, one inputted through a microphone. An appropriate adaptive filter is, for example, one adopting an FIR filter. An appropriate statistical model is, for example, the Hidden Markov model (HMM) in which the occurrence probability of a spectral pattern in a state transition is represented by a Gaussian distribution. The filter coefficient is controlled by, for example, using the expectation-maximization (EM) algorithm.

In this constitution, when the target signal is enhanced, the reference signal which has passed through the adaptive filter is subtracted from the main input signal by spectral subtraction, and the filter coefficient of the adaptive filter is controlled so that noise signal components are reduced in the enhanced output signal obtained as the result of the spectral subtraction. In this control, the filter coefficient has been heretofore changed based on the enhanced output signal in the noise interval, in which the target signal is not contained in the main input signal, so that the enhanced output signal squared is minimized. Accordingly, an unknown noise signal extemporaneously superimposed on the target signal in a target signal interval, in which the target signal is contained in the main input signal, could not be effectively reduced. In contrast, according to the present invention, the filter coefficient of the adaptive filter is controlled based on the likelihood of the signal model with respect to the enhanced output signal. Accordingly, noise reduction effect can be exerted even on unknown noise extemporaneously occurring in the target signal interval.

In a preferable aspect of the present invention, the main input signal is obtained by adding respective output signals from first and second signal conversion means, each of which converts an acoustic signal into an electric signal, in away that the target signals respectively contained in the output signals are added in the same phase. In addition, the reference signal is obtained by adding the respective output signals from the first and second signal conversion means in a way that the target signals respectively contained in the output signals are added in the opposite phases. Appropriate signal conversion means are, for example, microphones.

Moreover, in the case where the signal model for the target signal is based on the Hidden Markov model, the filter coefficient may be controlled by using the EM algorithm to obtain the filter coefficient value which maximizes the likelihood of the signal model with respect to the enhanced output signal, and updating the filter coefficient using the obtained value. In this case, if spectral subtraction is performed based on the results of performing Fourier transformation on the main input signal and the reference signal with a predetermined frame length and a predetermined frame period, the filter coefficient can be updated for every predetermined number of frames, e.g., for each utterance.

Furthermore, the signal enhancement device and method of the present invention can be applied to, for example, a speech recognition device and method. In that case, speech recognition is performed based on a speech signal enhanced by the signal enhancement device or method. Further, each means and step in the signal enhancement device and method can be realized by a computer program using a computer.

Thus, according to the present invention, noise reduction effect can be exerted even on an unknown noise signal which does not occur in a noise signal interval but extemporaneously occurs only in a target signal interval.

FIG. 1 shows the configuration of a speech enhancement device according to an advantageous embodiment of the present invention. This device includes two microphones 11*a* and 11*b* for converting acoustic signals into electric signals m1(t) and m2(t), respectively, an adder 12*a* for adding the input signals m1(t) and m2(t) together, an adder 12*b* for adding the input signal m2(t) to the input signal m1(t) after inverting the input signal m2(t), fast Fourier transformers 13*a* and 13*b* for performing fast Fourier transformation on the outputs from the adders 12*a* and 12*b*, an adaptive filter 14 provided on the output side of the fast Fourier transformer 13*b*, an adder 15 for adding the output of the adaptive filter 14 to the output of the fast Fourier transformer 13*a* after inverting the output of the adaptive filter 14, a database 16 of an acoustic model λ, and filter coefficient update means 17 for updating a filter coefficient of the adaptive filter 14 by referring to the output of the adder 15 and the acoustic model λ.

In this configuration, the input signals m1(t) and m2(t) can contain a target speech signal, which includes components based on target speech, such as an utterance, from a target speech source 1*s* located equidistant from the microphones 11*a* and 11*b*, and a noise signal, which includes components based on extemporaneous noise and white noise from a noise source 1*n* located in a direction different from that of the target speech source. The input signals m1(t) and m2(t) are added together by the adder 12*a*, and converted into a time series of spectrums by a fast Fourier transform performed by the fast Fourier transformer 13*a* with a predetermined frame length and frame period. The input signals m1(t) and m2(t) are also added together in the opposite phases by the adding means 12*b*, and similarly converted into data of frequency components by the fast Fourier transformer 13*b*.

The output of the fast Fourier transformer 13*b*, the amplitude of which is adjusted by the adaptive filter 14, is outputted to the adder 15. As represented by the aforementioned equation 4, the adder 15 subtracts the output of the adaptive filter 14 from the output of the fast Fourier transformer 13*a*, and outputs the result as an output signal Y.

For each utterance, based on the output signal Y, the filter coefficient update means 17 finds the filter coefficient of the adaptive filter 14 which maximizes the likelihood of the output signal Y with respect to the acoustic model λ, thereby updating the filter coefficient. The output signal Y obtained using the filter coefficient updated for each utterance is outputted as a signal E in which a speech signal based on the utterance is enhanced.

Thus, the filter coefficient update means 17 updates the filter coefficient of the adaptive filter 14 for each utterance so that the output signal Y matches with the acoustic model λ. At this time, the new filter coefficient w' is determined by the following filter update equation:

$$w' = \arg_w \max \Pr(Y|\lambda, w) \quad \text{[Equation 6]}$$

This filter update equation can be solved by the expectation-maximization (EM) algorithm using the acoustic model λ. As the acoustic model λ, one following a statistical model, such as the Hidden Markov model (HMM), can be used. In the EM algorithm, parameters of the model are updated by tentatively deciding the parameters of the model, calculating the number of state transitions of the model for observed data (hereinafter referred to as the "E step"), and performing maximum likelihood estimation based on the calculation result (hereinafter referred to as the "M step").

That is, first, in the E step (expectation step), the expected value of the log likelihood is calculated using equation 7.

$$\begin{aligned} Q(w' \mid w) &= E[\log Pr(Y \mid \lambda, w') \mid \lambda, w] \\ &= \sum_n Pr(Y(n) \mid \lambda, w) \cdot \log Pr(Y(n) \mid \lambda, w') \end{aligned} \quad \text{[Equation 7]}$$

This equation corresponds to, for example, equations (14) and (20) on page 193 in section III of "A maximum-likelihood approach to stochastic matching for robust speech recognition," A. Sankar, C. H. Lee, IEEE Trans. on Speech and Audio Processing, PP. 190-202, Vol. 4, No. 3, 1996. It is noted that n is a frame number in one utterance.

Next, in the M step (maximization step), a weight w which maximizes the value of equation 7 is found. The found weight w becomes a new filter coefficient. The weight w which maximizes the value of equation 7 can be found using the following equation:

$$\partial Q(w'|w)/_{\partial w'} = 0 \quad \text{[Equation 8]}$$

A general derivation is as described above. As a distribution representing an occurrence probability used in the acoustic model λ, an arbitrary distribution, such as a Gaussian distribution (normal distribution), a t-distribution, or a log-normal distribution, can be used. Next, an example in which a multidimensional Gaussian distribution is used will be shown. Although a model having a plurality of states can be used as an HMM, a mixture model having one state as represented by the equation below is used here. It is noted that an extension to a model having a plurality of states can be easily performed.

$$Pr(S) = \sum_k c_k \times N(S; \mu_k, V_k), \; \sum_k c_k = 1.0 \quad \text{[Equation 9]}$$

Here, $N(\mu_k, V_k)$ is a k-th multidimensional Gaussian distribution having a mean vector $\mu_k$ and a variance $V_k$, and $c_k$ is a weighting factor for the k-th multidimensional Gaussian distribution. Further, S is a feature of speech. Accordingly, in this case, there are three parameters concerning the acoustic model λ: the mean value $\mu_k$, the variance $V_k$, and the mixture weighting factor $c_k$ of the output probability distribution (multidimensional Gaussian distribution). The weighting factor $c_k$ and the multidimensional Gaussian distribution $N(\mu_k, V_k)$ can be learned with the EM algorithm using speech data for learning. A learning method based on the EM algorithm is a model learning method widely used in speech recognition, and can be found in a large number of documents. Such documents include, for example, "Hidden Markov models for speech recognition," X. D, Huang, Y. Ariki, and M. A. Jack, Edinburgh University Press, 1990, ISBN: 0748601627. In this document, the aforementioned parameter update equation is described as equations (6.3.17), (6.3.20), and (6.3.21) on pages 182 to 183.

In the case where the acoustic model λ is such an acoustic model, in order to solve equation 6 using the EM algorithm for estimating the filter coefficient w' so that the likelihood of the acoustic model λ with respect to the array output signal Y is maximized, i.e., based on a likelihood maximization criteria, first, the expected value of the log likelihood represented by the following equation is calculated in the E step.

$$\begin{aligned} Q(w' \mid w) &= E[\log Pr(Y \mid \lambda, w') \mid \lambda, w] \\ &= \sum_n \sum_k Pr(Y(n), k \mid \lambda, w) \cdot \log Pr(Y(n), k \mid \lambda, w') \\ &= \sum_n \sum_k Pr(Y(n), k \mid \lambda, w) \cdot \log N(Y(n); \mu_k, V_k) \end{aligned} \quad \text{[Equation 9]}$$

It is noted that only terms relating to the filter coefficient w desired to be found are described here. The state transition probability and the like are not necessary and therefore omitted. Upon equation 9, the following equation is established:

$$\begin{aligned} Q(w' \mid w) &= E[\log Pr(Y \mid \lambda, w)] \\ &= \sum_n \sum_k Pr(Y(n), k \mid \lambda, w) \cdot \log N(Y(n); \mu_k, V_k) \\ &= \sum_n \sum_k Pr(Y(n), k \mid \lambda, w) \cdot \left\{ \begin{array}{c} -\log(2\pi)^{D/2} \mid V_k \mid^{1/2} - \\ \frac{1}{2}\{Y(n) - \mu_k\}^T V_k^{-1} \{Y(n) - \mu_k\} \end{array} \right\} \\ &= -\sum_n \sum_k \gamma_k(n) \left\{ \begin{array}{c} \log(2\pi)^{D/2} \mid V_k \mid^{1/2} + \\ \frac{1}{2}\{p(n) - w' \cdot r(n) - \mu_k\}^T V_k^{-1} \\ \{p(n) - w' \cdot r(n) - \mu_k\} \end{array} \right\} \end{aligned} \quad \text{[Equation 10]}$$

Here, D is the number of dimensions of the multidimensional Gaussian distribution, and T indicates transpose. The value of $v_k(n)$ is found using the following equation:

$$\gamma_k(n) = Pr(Y(n), k|\lambda, w) \quad \text{[Equation 11]}$$

For the calculation of this $v_k(n)$, for example, equation (6.3.16) on page 182 in the aforementioned document "Hidden Markov models for speech recognition" can be referenced. Next, in the M step, w' which maximizes the aforementioned Q function Q(w'|w) is found as represented by the following equation:

$$w' = \underset{w'}{\operatorname{argmax}}\, Q(w' \mid w) \quad \text{[Equation 12]}$$

The filter coefficient w' can be found using the following equation:

$$\partial Q(w'|w)/_{\partial w'} = 0 \quad \text{[Equation 13]}$$

Accordingly, the weight $w_i'$ of the i-th dimension in the frequency subband can be found using the equation below. The subscript i corresponds to ω in the aforementioned equation 4.

$$w'_i = \frac{\sum_n \sum_k \gamma_k(n) \frac{r_i(n)\{p_i(n) - \mu_{k,i}\}}{\sigma^2_{k,i}}}{\sum_n \sum_k \gamma_k(n) \frac{r_i^2(n)}{\sigma^2_{k,i}}}$$ [Equation 14]

Here, $\sigma^2_{k,i}$ is the variance of the i-th dimension in the k-th distribution. When a new $w'_i$ has been found, the array output signal $Y_i$ is found using the new $w'_i$ as a new filter coefficient in the adaptive filter 14. Thus, a process of finding a new filter coefficient based on the output signal Y and again obtaining the output signal Y based on the new filter coefficient is repeated until the likelihood converges. Whether or not the likelihood has converged can be judged by whether or not the change of the value of the Q function Q(w' |w) has become a predetermined value or less. In the case where the likelihood has converged, the new filter coefficient at that time becomes an updated filter coefficient.

Figure 2:
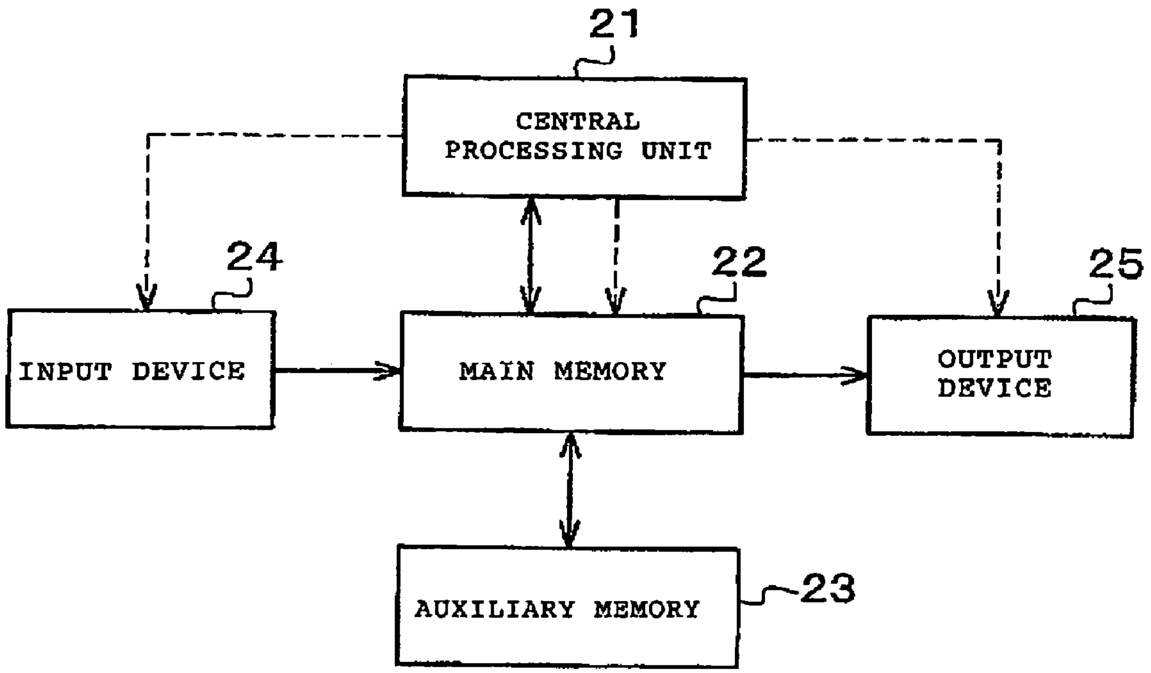
FIG. 2 is a block diagram showing the configuration of a computer which realizes the speech enhancement device of FIG. 1.

FIG. 2 shows the configuration of a computer which realizes the speech enhancement device of FIG. 1. This computer includes a central processing unit 21 for processing data based on a program and controlling each unit, a main memory 22 for storing the program being executed by the central processing unit 21 and relating data so that the central processing unit 21 can access the program and the data, an auxiliary memory 23 for storing programs and data, an input device 24 for inputting data and instructions, an output device 25 for outputting a processed result by the central processing unit 21 and performing a GUI function in cooperation with the input device 24, and the like.

The solid lines in the drawing show the flows of data, and the broken lines therein show the flows of control signals. On this computer, a speech enhancement program for causing the computer to function as the elements 12*a*, 12*b*, 13*a*, 13*b*, 14, 15, and 17 in the speech enhancement device of FIG. 1 is installed. Further, the input device 24 contains the microphones 11*a* and 11*b* in FIG. 1. The auxiliary memory 23 is provided with the database 16 of the acoustic model λ.

Figure 3:
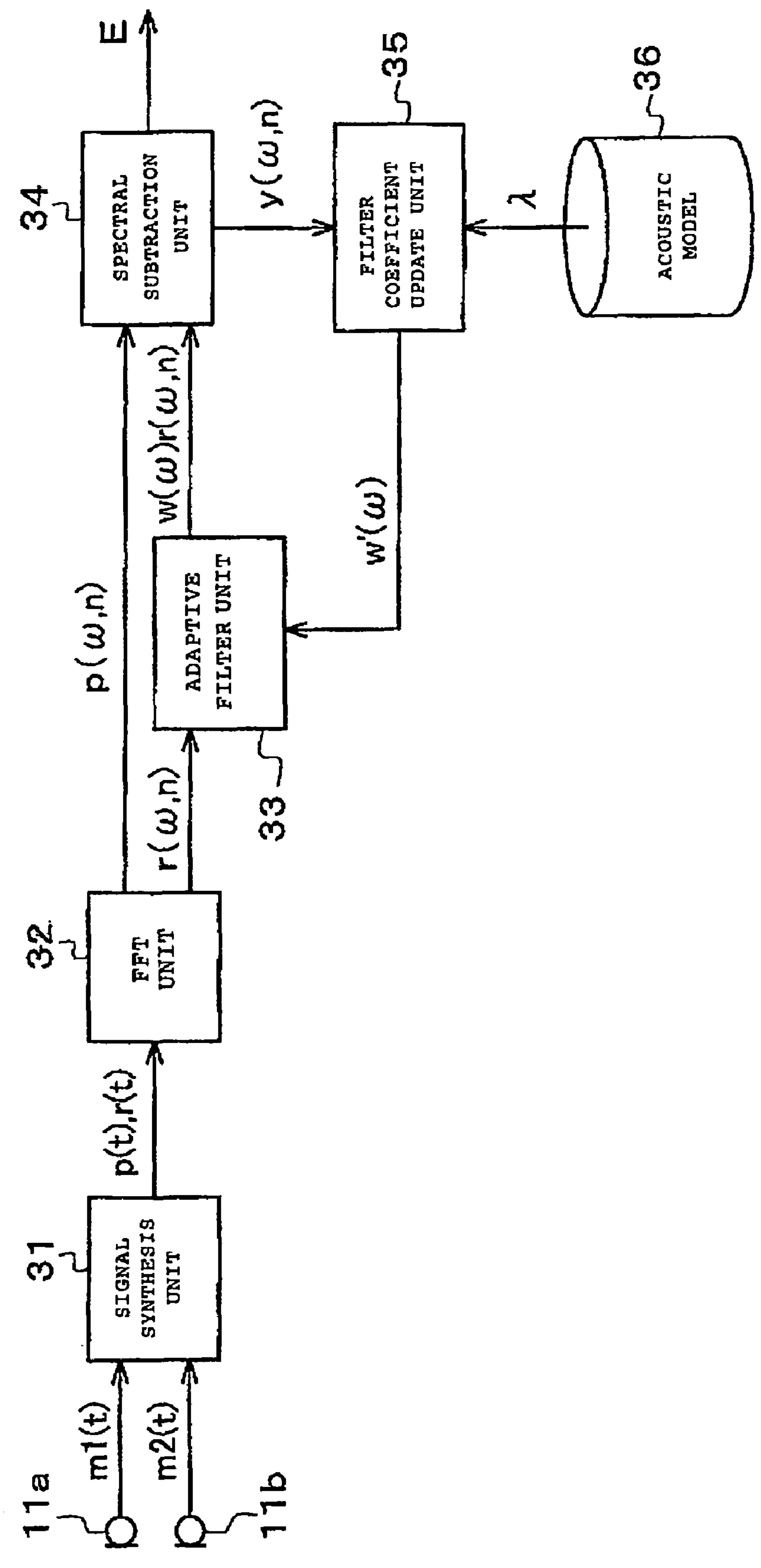
FIG. 3 is a block diagram showing a system configuration according to a speech enhancement program in the computer of FIG. 2.

FIG. 3 shows a system configuration according to the speech enhancement program. This system includes a signal synthesis unit 31 functioning as the adding means 12*a* and 12*b* of FIG. 1, an FFT unit 32 functioning as the fast Fourier transformers 13*a* and 13*b*, an adaptive filter unit 33 functioning as the adaptive filter 14, a spectral subtraction unit 34 functioning as the adder 15, and a filter coefficient update unit 35 functioning as the filter coefficient update means 17. The numeral 36 in the drawing denotes the database of the acoustic model λ.

The signal synthesis unit 31 adds the input signals m1 and m2 from the microphones 11*a* and 11*b* together so that the target speech signals s(t) are added together in the same phase as represented by the aforementioned equation 3, and outputs the resultant signal as the main input signal p(t). The signal synthesis unit 31 also adds the input signal m2 to the input signal m1 after inverting the input signal m2 so that the target speech signals s(t) cancel out each other as represented by the aforementioned equation 2, and outputs the resultant signal as the reference signal r(t). The FFT unit 32 converts the main input signal p(t) and the reference signal r(t) into frequency spectrum signals p(ω, n) and r(ω, n), respectively, using a predetermined frame period and frame length. The adaptive filter unit 33 adjusts the amplitude of the reference signal r(ω, n) in accordance with the filter coefficient w(ω). The spectral subtraction unit 34 subtracts the output w(ω)r(ω, n) of the adaptive filter unit 33 from the main input signal p(ω, n). For each utterance, the filter coefficient update unit 35 updates the filter coefficient in the adaptive filter unit 33 by finding the filter coefficient w' with the EM algorithm using the aforementioned equation 6 based on the output y(ω, n) of the spectral subtraction unit 34 and the acoustic model λ. Further, for each utterance, the spectral subtraction unit 34 outputs, as a signal E in which the target speech signal is enhanced, y(ω, n) generated based on the main input signal p(ω, n) and the reference signal r(ω, n) for one utterance using the updated filter coefficient.

Figure 4:
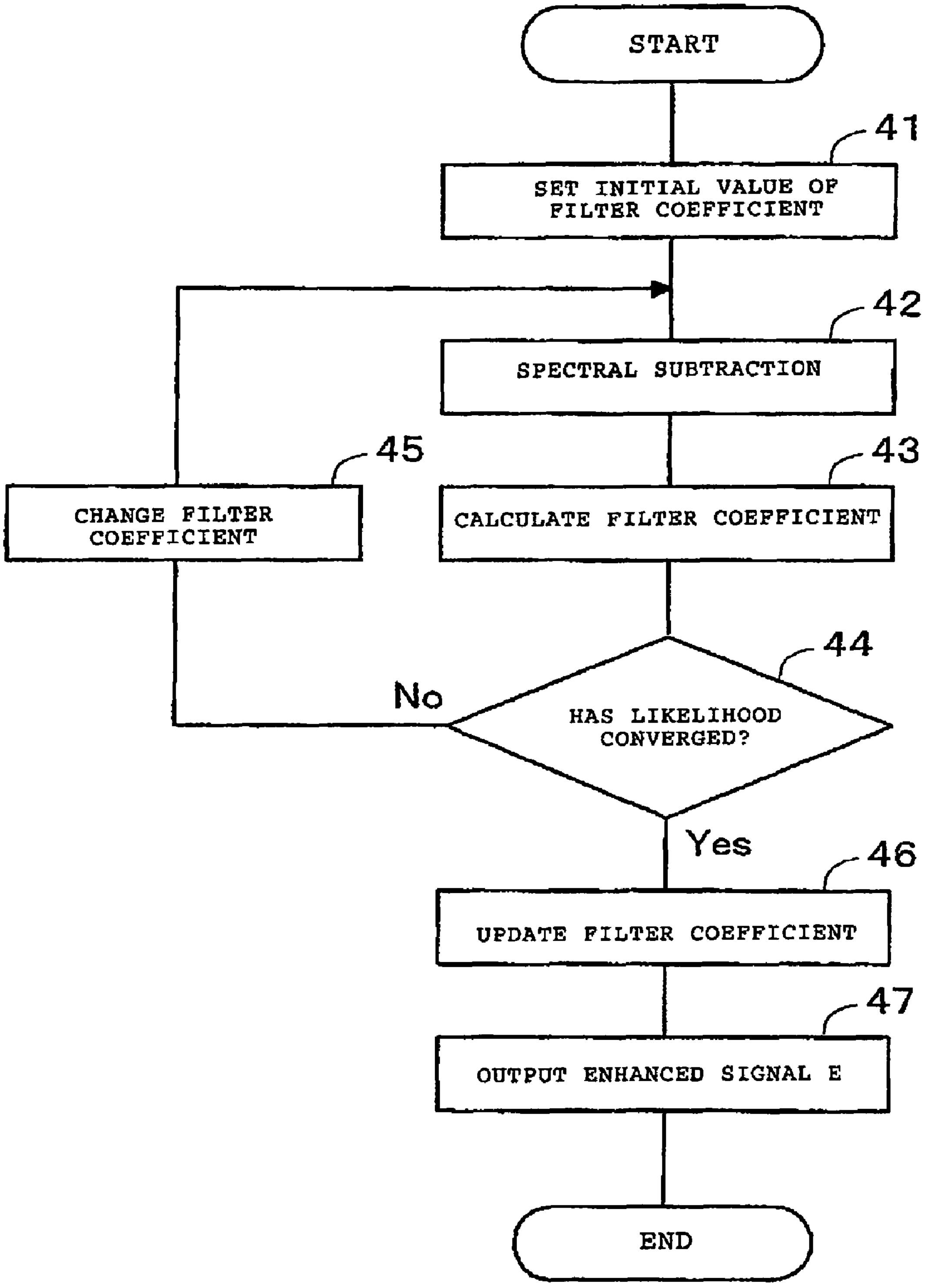
FIG. 4 is a flowchart showing a process according to the speech enhancement program of FIG. 3.

FIG. 4 shows a process concerning the main input signal p (ω; n) and the reference signal r(ω; n) for one utterance according to this speech enhancement program. It is assumed that the main speech signal p(ω; n) and the reference signal r(ω; n) for one utterance on which the FFT unit 32 has performed fast Fourier transformation are held on memory. The processes of the following steps are performed on data for one utterance.

When the process is started, first, in step 41, an initial value of the filter coefficient w(ω) of the adaptive filter is set to, for example, 1.0. Next, in step 42, the reference signal w(ω)r(ω); n) of which amplitude has been adjusted by the adaptive filter is subtracted from the main speech signal p(ω; n), thus obtaining the output signal y(ω; n). However, in this stage, the output signal y(ω; n) is not outputted as the signal E in which the target signal is enhanced. Then, in step 43, a new filter coefficient w' (ω) is found in accordance with the aforementioned EM algorithm through the E step and the M step.

Subsequently, in step 44, whether or not the likelihood of the acoustic model λ with respect to the output signal y has converged is judged. This judgment can be made based on whether or not the increase in the Q function Q(w'|w) of equation 10 from the previous value to the current one is a predetermined value or less. In the case where the likelihood has been judged not to have converged, the filter coefficient of the adaptive filter is changed for the new filter coefficient w' in step 45, and the process returns to step 42.

In the case where the likelihood has been judged to have converged in step 44, the new filter coefficient w' found in step 43 is a filter coefficient which maximizes the likelihood of the acoustic model λ with respect to the output signal Y. Accordingly, the process goes to step 46, and the filter coefficient of the adaptive filter is updated by replacing the filter coefficient with the new filter coefficient w'. Then, in step 47, the reference signal w' (ω)r(ω; n) adjusted using the updated filter coefficient w' is subtracted from the main speech signal p(ω; n), and the obtained signal is outputted as the output signal E in which the target speech signal is enhanced. Thus, a speech enhancement process for one utterance is completed.

Figure 5:
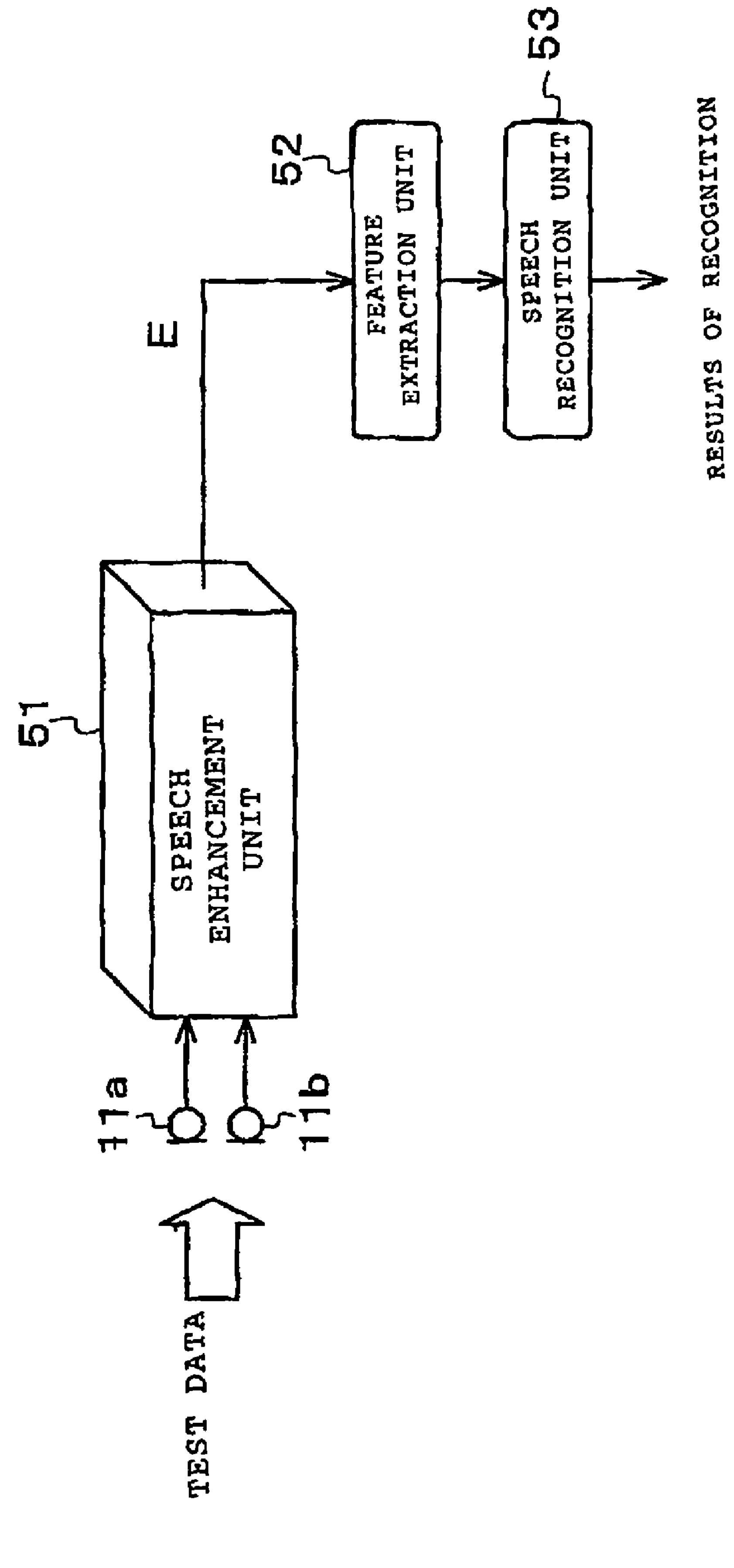
FIG. 5 is a block diagram showing the configuration of a speech recognition device according to one embodiment of the present invention.

FIG. 5 is a block diagram showing the configuration of a speech recognition device according to an embodiment of the present invention. As shown in the present drawing, this device includes a speech enhancement unit 51 for performing a speech enhancement process on input signals inputted through the microphones 11*a* and 11*b* and outputting a signal E in which speech is enhanced, a feature extraction unit 52 for extracting a predetermined feature from the enhanced signal E, and a speech recognition unit 53 for performing speech recognition based on the extracted feature. The speech enhancement unit 51, the feature extraction unit 52, and the speech recognition unit 53 can be realized by a computer and software similar to those of FIG. 2. The speech enhancement unit 51 is constituted by the speech enhancement device of FIG. 1 or 3.

As an example of speech recognition using this speech recognition device, speech recognition was previously performed on speech recorded in a car of which engine was stopped, and error rates were measured.

That is, first, the mixture number of a Gaussian mixture model (GMM) used for estimation of the filter coefficient of the adaptive filter, i.e., the number of multidimensional Gaussian distributions, is set to 256, and an unspecified speaker HMM was created by learning the GMM using speech data for 95 male speakers.

Figures 6, 7:
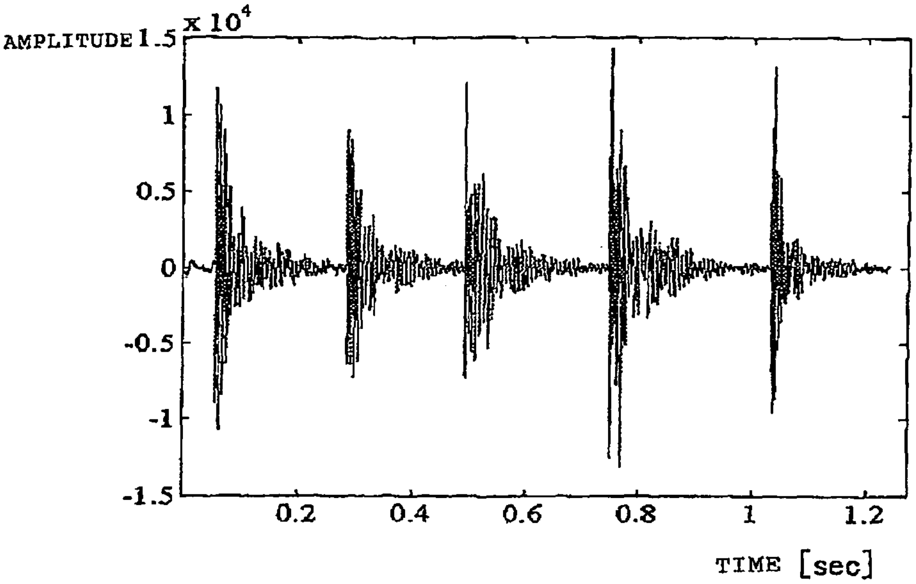
FIG. 6 is a graph showing extemporaneous noise caused by knocking a window, which extemporaneous noise is applied to an example of speech recognition by the speech recognition device of FIG. 6.
FIG. 7 is a view of a table showing the results of speech recognition by the speech recognition device of FIG. 6.

Next, input signals m1(t) and m2(t) were created using utterance data for 411 utterances about consecutive numbers of 5 to 11 digits by 37 male test speakers, which utterances had been previously recorded in the car, and using impulse responses of the microphones 11*a* and 11*b* to a previously measured sweep tone, and then speech recognition was performed based on these input signals to measure error rates. Here, the distance between the microphones 11*a* and 11*b* was set to 30 cm, and a target speaker faced to the front, i.e., in the direction of 90 degrees. Idling noise of 25 dB was added to all intervals from the direction of 20 degrees. Further, as noise existing only in utterance intervals, extemporaneous noise caused by knocking a window as shown in FIG. 6 was added from the direction of 140 degrees, and reproduced sound of a music CD was added from the direction of 40 degrees. Error rate measurement was performed in the case where knocking sound of 0 dB was added, the case where knocking sound of 5 dB was added, the case where knocking sound of 0 dB and CD sound of 0 dB were added, and the case where knocking sound of 5 dB and CD sound of 5 dB were added, individually. The results of measuring error rates are shown in the column for the example in the table of FIG. 7.

For comparison purposes, error rates were measured in the same cases by performing speech recognition under the same conditions as those of the above-described example, except for the fact that one-channel input signal was used and that a noise reduction process was not performed. The results of the measurement are shown in the column for comparative example 1 in the table of FIG. 7.

Figure 8:
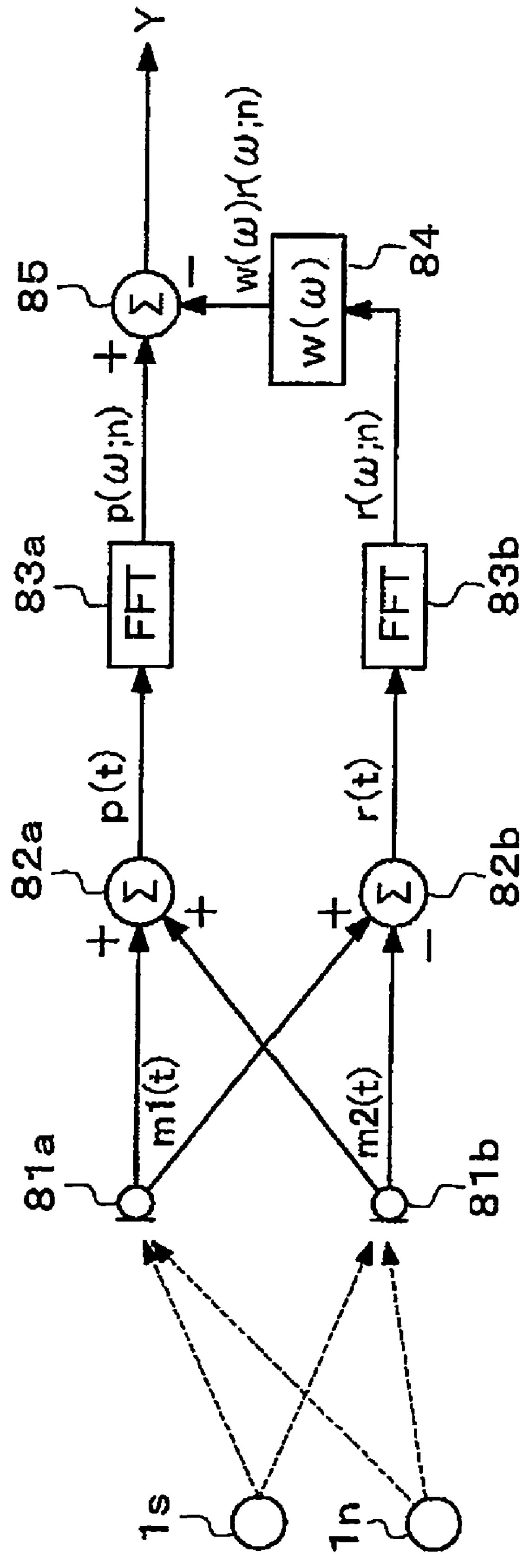
FIG. 8 is a block diagram showing a conventional speech enhancement system using a two-channel beamformer.

Moreover, error rates were measured in the same cases by performing speech recognition under the same conditions as those of the above-described example, except for the fact that speech enhancement was performed by estimating the filter coefficient of the adaptive filter based on a power minimization criteria by conventional two-channel spectral subtraction using as the speech enhancement unit 51 the speech enhancement device of the conventional configuration of FIG. 8. Here, the filter coefficient was estimated based on an input signal for one second immediately before an utterance interval. The results of the measurement are shown in the column for comparative example 2 in the table of FIG. 7.

From the table of FIG. 7, it can be seen that the recognition rate is considerably improved by the example compared to comparative examples 1 and 2. That is, it can be seen that in the speech enhancement unit 51, a noise reduction function is effectively exerted even on unknown extemporaneous noise existing only in speech intervals.

Incidentally, the present invention is not limited to the above-described embodiment, but can be carried out by appropriately modifying the embodiment. For example, in the above-described embodiment, the input signals m1 and m2 are added together in the same phase by directly adding the input signals m1 and m2 based on the target sound source located equidistant from the two microphones. However, instead of this, the phases of the input signals m1 and m2 may be equalized by delay means.

Moreover, in the above-described embodiment, a microphone array having two microphones is used. However, instead of this, a microphone array having three or more microphones may be used. For example, suppose that a three-channel microphone array is used. If input signals from the microphones at time t based on a target sound source located at the front are denoted by m1(t), m2(t), and m3(t), a main input p(t) is represented as $p(t)=\frac{1}{3}(m1(t)+m2(t)+m3(t))$, a reference signal r1(t) is represented as $r1(t)=m1(t)-m2(t)$, and a reference signal r2(t) is represented as $r2(t)=m2(t)-m3(t)$. In this case, the respective filter coefficients w1 and w2 of adaptive filters for the reference signals r1(n) and r2(n) can be found by applying $p(n)-\{w1*r1(n)+w2*r2(n)\}$ to a Q function in the EM algorithm. It is noted that in the case where the target sound source is not located in front of the microphone, the differences in arrival time of the target sound among the microphones can be adjusted by delay means.

Further, in the aforementioned embodiment, the reference signal is obtained by subtracting the input signal m2 from the input signal m1. However, instead of this, a signal similar to a noise signal contained in the main speech signal, e.g., a signal which has been obtained by a microphone located in the vicinity of a noise source and which contains almost only noise, may be used as the reference signal.

In addition, in the aforementioned embodiment, the filter coefficient is updated for each utterance, and the target speech signal is enhanced using the updated filter coefficient. However, instead of this, the target speech signal may be enhanced by updating the filter coefficient for each frame or for every plurality of frames.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A signal enhancement device comprising:

a spectral subtraction unit for subtracting a given reference signal from a main input signal containing a target signal and a noise signal by spectral subtraction;

first and second signal conversion devices, each of which converts an acoustic signal into an electric signal;

an adaptive filter applied to said reference signal;

a filter coefficient update unit for controlling a filter coefficient of said adaptive filter in order to reduce the noise signal component in said main input signal; and a database of a signal model concerning said target signal expressing a given feature concerning the target signal by means of a given statistical model, wherein said filter coefficient control update unit performs control of said filter coefficient based on a likelihood of said signal model with respect to an output signal from said spectral subtraction unit;

wherein said main input signal is obtained by adding respective output signals from said first and second signal conversion means in a way that said target signals respectively contained in said output signals are added in the same phase; and wherein said reference signal is obtained by adding said respective output signals from said first and second signal conversion means in a way that said target signals respectively contained in said output signals are added in the opposite phases.

2. A speech recognition device comprising:

the signal enhancement device according to claim 1; and a speech enhancement unit for performing speech recognition based on a speech signal enhanced by said signal enhancement device.

3. The signal enhancement device according to claim 1, wherein said statistical model is based on a Hidden Markov model, and said filter coefficient update unit updates said filter coefficient by obtaining using the EM algorithm a filter coefficient value which maximizes said likelihood, and replacing the value of said filter coefficient with said filter coefficient value which maximizes said likelihood.

4. The signal enhancement device according to claim 3, wherein said spectral subtraction unit performs Fourier transformation on said main input signal and said reference signal with a predetermined frame length and a predetermined frame period, and said filter coefficient update unit updates said filter coefficient for every predetermined number of frames.

5. A method of enhancing a signal, comprising the steps of:

performing spectral subtraction for obtaining an enhanced output signal by subtracting a given reference signal from a main input signal containing a target signal and a noise signal by spectral subtraction;

converting an acoustic signal into an electric signal using first and second signal conversion means;

applying an adaptive filter to said reference signal;

coefficient controlling for controlling a filter coefficient of said adaptive filter in order to reduce the noise signal component in said main input signal, wherein said coefficient controlling comprises referencing a signal model concerning said target signal expressing a given feature by means of a given statistical model, and controlling said filter coefficient based on a likelihood of said signal model with respect to said enhanced output signal;

obtaining said main input signal by adding respective output signals from said first and second signal conversion means in a way that said target signals respectively contained in said output signals are added in the same phase; and obtaining said reference signal by adding said respective output signals from said first and second signal conversion means in a way that said target signals respectively contained in said output signals are added in the opposite phases.

6. A method of speech recognition, comprising the steps of:

enhancing a speech signal by the method according to claim 5; and performing speech recognition based on said enhanced speech signal.

7. The method according to claim 5, wherein said statistical model is based on the Hidden Markov model, and said coefficient controlling comprises updating said filter coefficient by obtaining using the EM algorithm a filter coefficient value which maximizes said likelihood, and replacing the value of said filter coefficient with said filter coefficient value which maximizes said likelihood.

8. The method, according to claim 7, wherein said performing spectral subtraction comprises performing Fourier transformation on said main input signal and said reference signal with a predetermined frame length and a predetermined frame period, and said coefficient controlling comprises updating said filter coefficient for every predetermined number of frames.

9. An article of manufacture comprising a non-transitory computer readable medium having computer readable program instructions stored thereon that, when executed by a computer, implement a method of signal enhancement by executing the steps according to claim 5.

10. An article of manufacture comprising a non-transitory computer readable medium having computer readable program instructions stored thereon that, when executed by a computer, implement a method of speech recognition by executing the steps according to claim 6.

11. An article of manufacture comprising a non-transitory computer readable medium having computer readable program instructions stored thereon that, when executed by a computer, implement a method of enhancing a signal by executing the steps of claim 7.

12. An article of manufacture comprising a non-transitory computer readable medium having computer readable program instructions stored thereon that, when executed by a computer, implement a method of enhancing a signal by executing the steps of claim 8.

* * * * *